July 25, 1944.　　　O. S. CARLISS　　　2,354,301

WEIGHING PENDULUM AND RECORDER DISK ASSEMBLY

Original Filed Nov. 24, 1941　　2 Sheets-Sheet 1

INVENTOR
Oswald S. Carliss,
BY
ATTORNEY

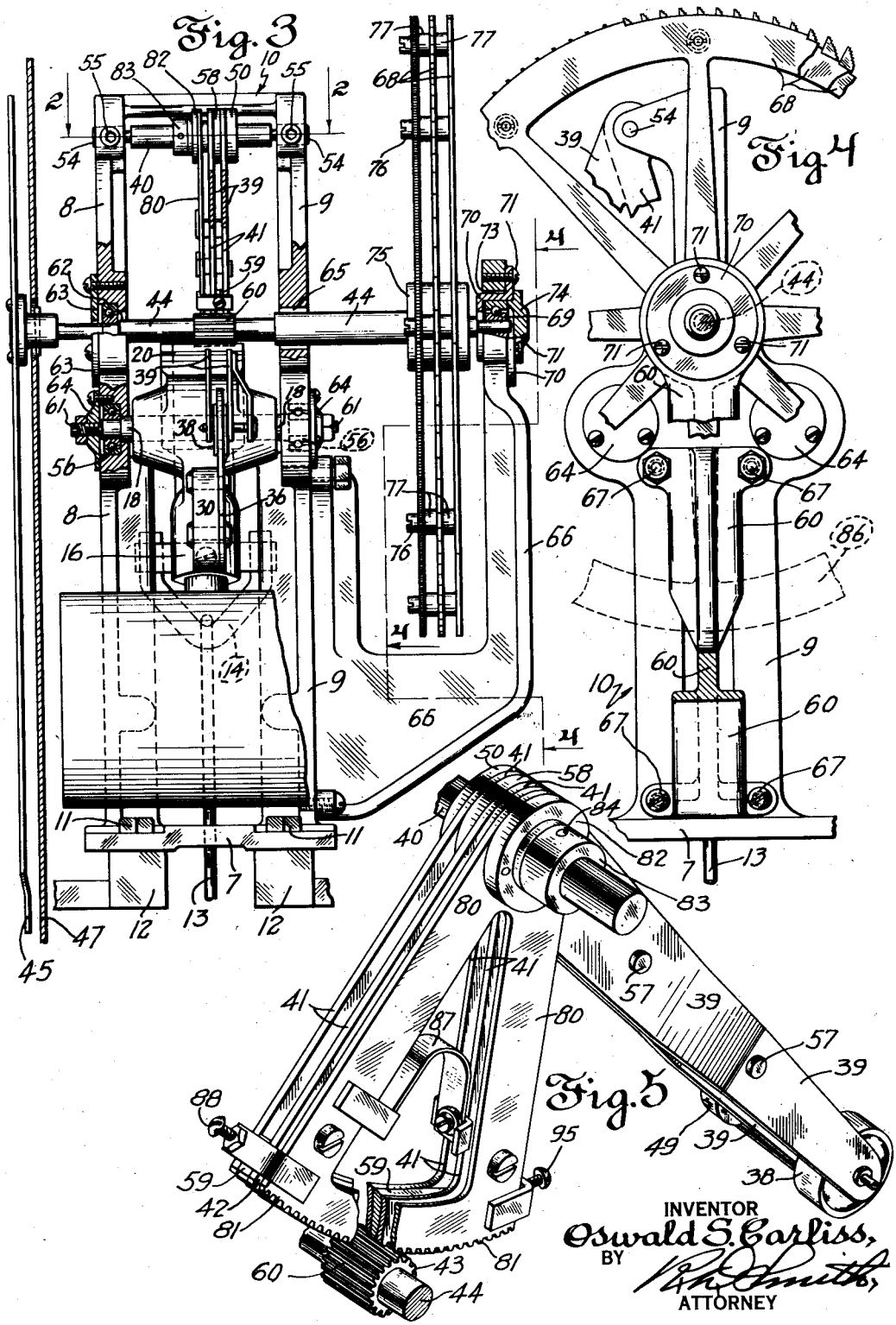

Patented July 25, 1944

2,354,301

UNITED STATES PATENT OFFICE 2,354,301

WEIGHING PENDULUM AND RECORDER DISK ASSEMBLY

Oswald S. Carliss, Fairfield, Conn., assignor, by mesne assignments, to The Yale & Towne Manufacturing Company, Stamford, Conn., a corporation of Connecticut Original application November 24, 1941, Serial No. 420,208. Divided and this application March 8, 1943, Serial No. 478,355

10 Claims. (Cl. 265—5)

This invention relates to load counterbalancing and weight indicating mechanism sometimes incorporating physically graduated devices such as peripherally stepped disks adapted to be sensed by feeler fingers for positioning weight recording type in correspondence with different positions of a visual weight indicator. The present improvements further relate in part to mechanism in a weighing scale which serves to transmit motion from such load counterbalancing mechanism to such weight indicator and to such stepped disks and also relates to improved construction and arrangement of bearings for pivotally supporting such stepped disks in a manner to be sensitively free for movement in weight measuring direction in response to load caused action of the counterbalancing mechanism and yet sturdily supported against distortion or displacement in any other direction.

While the present improvements are not limited to mechanism incorporated within automatic weighing scales they may be embodied in such and are herein disclosed with reference to a particular type of dial head unit more fully disclosed in United States Patents No. 2,083,413, granted June 8, 1937, and No. 2,173,746, granted September 19, 1939. This application is divisional from my copending application, Serial No. 420,208, filed November 24, 1941.

It is an object of the present invention to maintain desirable ruggedness and dependable fixity of certain pivotal bearings for the load counterbalancing pendulums while enabling the weight indicating pointer spindle to carry the added burden of a bank of peripherally stepped disks which serve to determine the positioning of printing type for recording whatever value of weight the pointer may chance to indicate. A related object is to insure against accidental displacement of such stepped disks from concentricity with their fixed axis of rotation and without adding any objectionable resistance to the freedom of the indicator spindle to sweep sensitively over a long scale of weight designating graduations.

The foregoing and other related objects of the invention will appear in greater particular from the following description of a practical embodiment of the invention which description refers to the accompanying drawings and serves to point out certain principles that may be incorporated in various embodiments of the invention.

All figures of the drawings which show parts in section are views looking in the direction of the arrows which designate the several numbered section planes.

In the drawings:

Fig. 3 is an edgewise view looking from the right toward Fig. 1 showing some of the structure cut away better to expose parts in which the improvements particularly reside.

Fig. 4 is a fragmentary view of the dial head unit in rear elevation showing parts of the frame structure in section on planes 4—4 in Fig. 3.

Fig. 5 is an enlarged isometric view of intermeshed gear members which motivate the pointer spindle.

Figure 1:
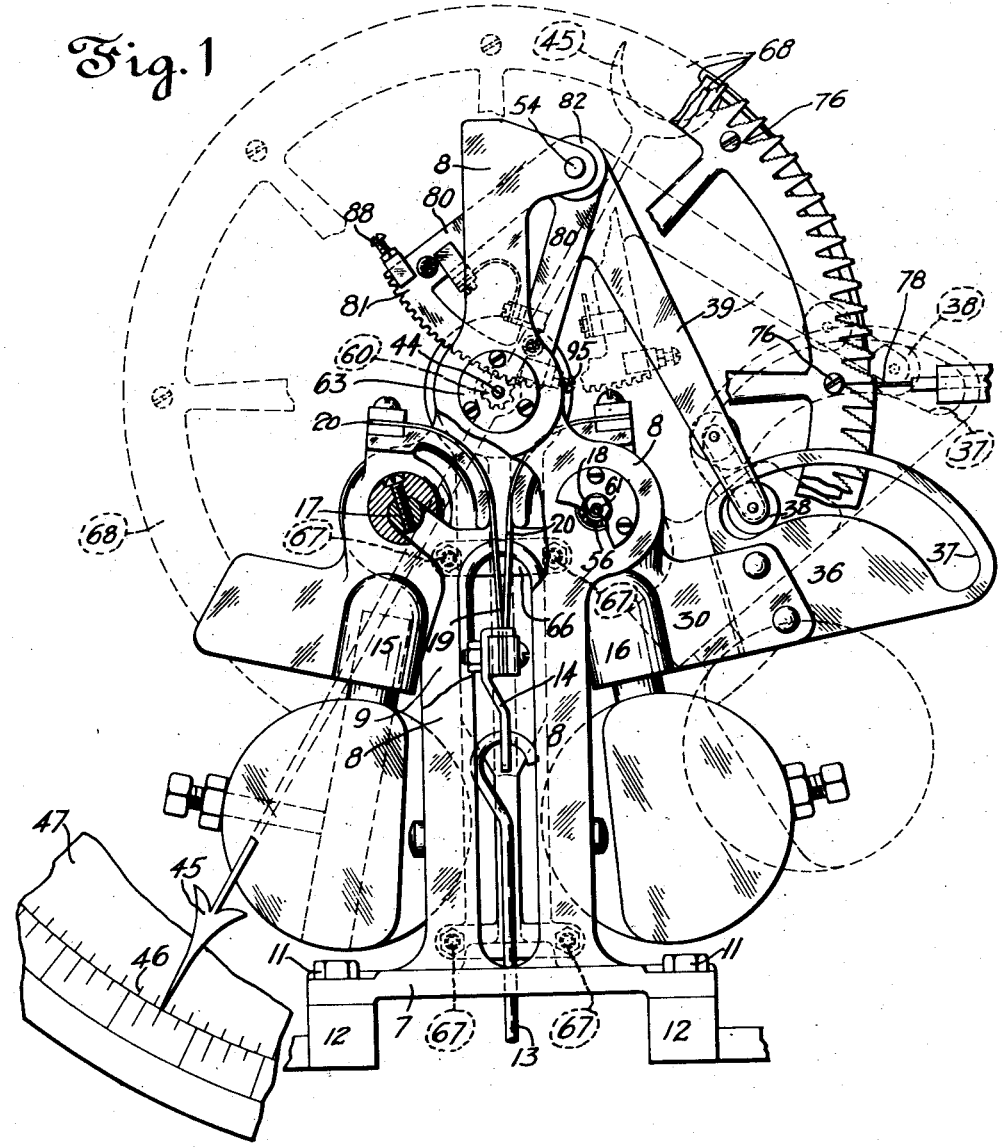
Fig. 1 is a front elevation of the dial head unit of a weighing scale embodying the present improvements and incorporating stepped disks to be sensed in the recording of weight values.

Portions of the dial head unit of Figs. 1, 3 and 4 may be like corresponding parts disclosed in U. S. Patent No. 2,083,413 and will therefore be designated herein by similar reference numerals. A skeleton cast metal frame indicated as a whole by 10 includes front and intermediate frame walls or standards 8 and 9 upstanding and rigid with respect to a common base structure 7, the latter being mounted by means of bolts 11 on any suitable support 12 which may constitute the header of a scale column of the type commonly associated with a depressible platform or other weight responsive receptacle adapted to support a weighable load. Such column and platform are not herein shown, it sufficing to mention that the weighable load exerts a downward pull on draft rod 13 which is suspended by means of its hooked upper end from a V-shaped coupling loop 14.

Front and intermediate standards 8 and 9 flank respectively opposite sides of the arms of two pendulums 15 and 16. These pendulums act jointly to counterbalance the pull of the load on draft rod 13 and are mounted respectively by means of trunnion-like bearing shafts 17 and 18 on and between standards 8 and 9 and jointly support the coupling loop 14 by means of flexible suspension straps 19 and 20, respectively.

Shafts 17 and 18 are rotatably supported and held antifrictionally to a fixed axis of rotation despite all shocks and vibrations by means of ball bearings 56 which are removably embedded in and supported by each of the spaced standards 8 and 9. In accordance with the construction proposed in the aforesaid Patent 2,083,413, dirt may be excluded from each of ball bearings 56 by means of a removable cover cap 64. Each such cap is penetrated by a cone pointed adjustable screw 61 which takes the end thrust of the pendulum shaft and is threaded into the cap.

Figure 2:
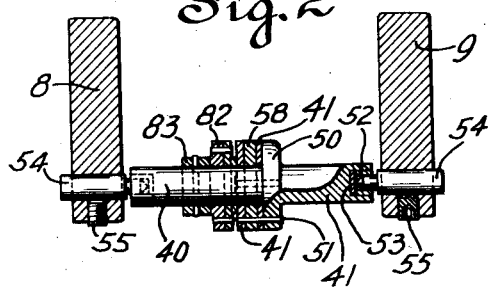
Fig. 2 is an enlarged view taken in section on the plane 2—2 in Fig. 3.

Pendulum 16 fixedly carries a fin 30 and a plate 36 which latter contains a cam slot 37 along which freely rides the roller 38. This roller is pivotally carried at the end of an arm 39 of a main sector 41 whose hub portion is fixed to flange 50 on sector shaft 40 by means of pins 51 as best shown in Fig. 2. Each end of shaft 40 contains a center recess which is lined by a hardened bushing 52 backed by a hardened thrust disk 53. A pintle 54 is lodged coaxially with shaft 40 in each of the front and intermediate standards 8 and 9 and is longitudinally adjustable therein when set screw 55 is loosened. The diameter of the cone pointed end of each pintle 54 which takes the end thrusts of shaft 40 has a slip fit in relation to the inside diameter of bushing 52 so that shaft 40 is entirely free to turn but is permitted no diametrical looseness nor play.

The sector is composed of similar laterally spaced laminae 41 which are secured fixedly together to act as an integral mechanical part by means of suitable spacers and fastening rivets such as 51, 57. One of these spacers may comprise a hub washer 58 while other spacers or weighting bodies as 49 may serve to separate the arm portions of the sector laminae at the location of fastening rivets such as 57 therein. Along their arcuate margins the sector laminae 41 carry fixedly sandwiched therebetween the correspondingly shaped arcuate bar 59. Gear teeth 42 are cut crosswise in the combined peripheral edges of laminae 41 and bar 59 which teeth thus have a length equal to the combined thicknesses of said laminae and bar.

Teeth 42 of the main sector gear 39 mesh with teeth 43 of a pinion 60 cut in a pinion blank which may be fixed on, or integral with, the indicator shaft or spindle 44 intermediate its length. This spindle protrudes at the front of standard 8 as shown in Fig. 3 and thereat carries fixedly the weight indicating pointer 45 in a position so that the arrow-tipped end of the latter sweeps over the weight graduations 46 marked on dial 47, which dial is stationary with frame 10. Close to pointer 45, spindle 44 is supported sturdily and antifrictionally in a ball bearing 62 embedded in standard 8 and protected by the dust cap 63 which contains a clearance hole freely accommodating spindle 44.

Spindle 44 passes freely through a clearance hole 65 in the intermediate standard 9 and, at a location spaced substantially rearward of standard 9, is given anti-frictional bearing in a rear standard 66 here pictured in the form of a U-shaped rigid bracket firmly and removably secured to the intermediate standard 9 by bolts 67. The U-shape of bracket 66 accommodates the full diameter of a series of stepped disks 68 which could not be placed between the front and intermediate standards 8 and 9 because each disk when desirably large to afford room for one thousand individual steps about its periphery would interfere with pendulum shafts 17 and 18. In other words the axes of the pendulum shafts if projected must intercept these disks if the disk diameter is made desirably large. A reduced rear end portion of spindle 44 is rotatably supported in a ball bearing 69 whose outer race may be lodged with a nice fit directly in a recess 73 which is bored into bracket 66 but which is herein shown as lodged in a diametrically adjustable cup 70 having a peripheral flange adjustably secured to bracket 66 by screws 71 occupying oversized holes through this cup flange. This construction permits corrective variation of the centralization of ball bearing 69 relative to bracket 66 so that the former may be mounted in exact axial alignment with bearing 62 irrespective of any small inaccuracy in the dimensions of bracket 66 or in its positioning on standard 9.

The stepped disks 68 may be termed recorder disks and may be like those designated as 29, 30 and 31 in U. S. Patent No. 2,173,746 and may be held together in a unitary bank by being mounted on a common hub 75 fixed to spindle 44 and by being joined in axially spaced fixed relation by screws 76 and separator collars 77 at points near their peripheries. In Fig. 1 the location of one of a line of blade-like members 78 is indicated which may serve as feelers to sense the various steps of disks 68 which steps, by revolving to a position opposite such feelers, determine what weight will be recorded in a well known manner. An example of the action of such feelers is given in greater particular in U. S. Patent No. 2,198,139.

The step sensing thrust exerted by such feelers 78 and directed radially toward the spindle 44 may tend to deflect this spindle eccentrically if the latter is not firmly supported for free rotation at points on both sides of and preferably near the carried disks. The minuteness of the step dimensions on disk 68 would cause such deflection to result in inaccurate recording of weight. Such deflection is completely eliminated by these improvements by extending the length of spindle 44 so that both ends of the spindle are journaled in ball bearings on respectively opposite sides of the stepped discs at least one of which bearings is near the stepped disks. Thus the spindle is given anti-friction rotary support on opposite sides of the disks even though the latter are of such large diameter as to preclude their being located between frame standards 8 and 9.

There is an auxiliary sector 80 having teeth 81 also in mesh with the teeth of pinion 60 and fixed on a hub 82 on shaft 40. As auxiliary sector 80 is rotatably loose on shaft 40 relative movement between auxiliary sector 80 and main sector 41 is restricted by adjustable stop screws 85, 86 and influenced by bowed leaf spring 87. Further details of a practical construction for the sector mechanism are fully set forth in my aforesaid copending application Serial No. 420,208.

Starting with the parts positioned as in Fig. 1, in a weighing scale incorporating these improvements the downward pull of a weighable load on rod 13 swings both pendulums upward and swings pendulum 16 counterclockwise about its antifriction bearings 56 whereupon roller 38 follows cam slot 37 resulting in counterclockwise swinging of the composite sector gear 30—41 to weighing position. Pinion 60 will thereupon be impelled clockwise together with spindle 44, its carried pointer 45 and stepped disks 68, through the medium of the backlash absorbing spring 87. Pointer 45 will indicate the weight. The stepped disks 68 are protected from disturbance by eccentric deflection of spindle 44 because this spindle is sturdily supported at its extreme end in the close neighborhood of disks 68 by the antifriction bearing 69 carried in the newly provided removable frame bracket 66 which enables disks 68 to be of sufficiently large diameter to reduce the likelihood of errors resulting from any slight deviation from true position of the correspondingly larger steps of the disk which are sensed and pressed against by feelers 78 to determine what weight shall be recorded.

Thus an improved dial head mechanism for a weighing scale is provided whose accuracy in indicating and recording weight is materially increased and also made immune to many troublesome effects of vibrations heretofore encountered while weighing loads in localities where heavy vibration of industrial operations reach the scale.

The disclosure hereof will be suggestive of many modifications that can be resorted to in practicing the underlying principles of the invention, and hence the appended claims will be understood as directed to and intended to cover all known substitutes and equivalents for the particular parts, arrangements and functions herein disclosed and referred to in the claims.

I claim:

1. In a dial head unit for weighing and recording scales, the combination of, a dial head frame including front and intermediate and rear upstanding spaced bearing standards rising from a common base structure, a shaft extending crosswise past said intermediate frame standard and rotatably supported in both said front and rear frame standards, at least one weighing pendulum supported in both said front and intermediate standards to swing about a stationary axis, mechanism operatively associating said shaft with said pendulum, at least one recorder disk of large enough diameter to be intercepted by said axis if projected, said disk being carried by said shaft between said intermediate and rear bearing standards, and a ball bearing eccentrically shiftable in said rear bracket in which said shaft is journaled.

2. In a dial head unit for weighing and recording scales, the combination of, a dial head frame including front and intermediate and rear spaced bearing standards upstanding and rigid with respect to a common base structure, said rear standard being removably joined to said intermediate standard, a shaft extending crosswise past said intermediate frame standard and rotatably supported in both said front and rear frame standards, ball bearings in said front and rear frame standards respectively in which said shaft is journaled, at least one weighing pendulum supported in both said front and intermediate standards to swing about a stationary axis, mechanism operatively associating said shaft with said pendulum, and at least one recorder disk of large enough diameter to be intercepted by said axis if projected, said disc being carried by said shaft between said intermediate and rear bearing standards, said ball bearing in said rear standard being eccentrically shiftable in said rear standard for accurately aligning the same with the other ball bearing despite positional inaccuracy of said rear standard relative to said intermediate standard.

3. In a dial-head unit for heavy duty weighing and recording scales, the combination of, a dial-head frame including front, intermediate and rear spaced frame standards rigid with respect to a common base structure, a shaft extending crosswise and past said intermediate frame standard unsupported by the latter and journaled in bearings on both said front and rear frame standards, at least one weighing pendulum supported by and intermediate both said front and intermediate standards in a manner to swing about an axis for counterbalancing heavy loads, mechanism operatively associating said shaft with said pendulum, and at least one recorder disk of large enough diameter to be intercepted by the projection of said axis, said disk being carried upon said shaft between said intermediate and rear frame standards.

4. In a dial-head unit for heavy duty weighing and recording scales, the combination of, a dial-head frame including front, intermediate and rear spaced frame standards rigid with respect to a common base structure, a shaft extending crosswise and past said intermediate frame standard unsupported by the latter and journaled in bearings on both said front and rear frame standards, at least one weighing pendulum supported by and intermediate both said front and intermediate standards in a manner to swing about an axis for counterbalancing heavy loads, mechanism operatively associating said shaft with said pendulum, and at least one recorder disk of large enough diameter to be intercepted by the projection of said axis, said disk being carried upon said shaft between said intermediate and rear frame standards relatively close to said rear standard and relatively far from said intermediate standard.

5. In a dial head unit for heavy duty weighing and recording scales, the combination of, a dial head frame including front, intermediate and rear spaced frame standards rigid with respect to a common base structure, said rear standard being removably joined to said intermediate standard, a shaft extending crosswise and past said intermediate frame standard unsupported by the latter and journaled in bearings on both said front and rear frame standards, at least one weighing pendulum supported by and intermediate both said front and intermediate standards to swing about an axis for counterbalancing heavy loads, mechanism operatively associating said shaft with said pendulum, and at least one recorder disk of large enough diameter to be intercepted by the endwise projection of said axis, said disk being carried upon said shaft between said intermediate and rear frame standards.

6. In a dial head unit for weighing and recording scales, the combination of, a dial head frame including front and intermediate and rear spaced frame standards rigid with respect to a common base structure, said rear standard being U-shaped to provide spaced vertical branches one of which is removably joined to said intermediate standard, a shaft extending crosswise and past said intermediate frame standard and journaled in bearings on both said front and rear frame standards, at least one weighing pendulum supported by and intermediate both said front and intermediate standards to swing about an axis, mechanism operatively associating said shaft with said pendulum, and at least one recorder disk of large enough diameter to be intercepted by the endwise projection of said axis, said disc being carried upon said shaft and occupying the space between said vertical branches.

7. In a dial head unit for weighing and recording scales, the combination of, a dial head frame including front and intermediate and rear spaced frame standards upstanding and rigid with respect to a common base structure, a shaft extending cross-wise and through said intermediate frame standard unsupported by the latter and journaled in bearings in both said front and rear frame standards, weighing pendulums having trunnions, ball bearings in both said front and intermediate standards at a lower level than said shaft in which said trunnions are respectively journaled, at least one recorder disk of large enough diameter to flank the rear ends of said trunnions, said disc being carried by said shaft between said intermediate and rear frame standards, and mechanism constructed and arranged to transmit movement from one of said pendulums to said shaft, said mechanism including a gear segment pivotally supported by said front and intermediate standards at a higher level than said shaft.

8. In a dial head unit for weighing and recording scales, the combination defined in claim 7, in which the said shaft projects forward from the said front frame standard, together with a weight indicating pointer carried by said shaft at the front of said front standard traversing an areal path flanking the front ends of the said trunnions, whereby both said pointer and the said recorder disk can possess sufficient radial extent to flank the respectively opposite ends of said trunnions without depriving said shaft of pivotal support on opposite sides of said recorder disc.

9. In dial head mechanism for weighing scales, a swingable load counterbalancing pendulum arm, frame walls spaced apart and closely flanking said pendulum arm, at least one trunnion carrying said pendulum arm and confined substantially to the space between and embraced by said frame walls, a horizontal indicator spindle spanning the space between said frame walls pivotally supported by the wall at the front of said pendulum arm and extending a substantial distance to the rear of the other of said walls, mechanism operatively associating said spindle with said pendulum arm, a frame bracket supported in fixed relation to said walls having an extension spaced substantially to the rear of said other wall reaching upward to the level of said indicator spindle, a bearing carried by said bracket in which the rear end of said indicator spindle is journaled, and stepped discs larger in radius than the distance between said spindle and said trunnion carried on said spindle between said other wall and said extension of the frame bracket.

10. In dial head mechanism for weighing scales, a pair of cooperatively connected load counterbalancing pendulum arms, frame walls spaced apart and closely flanking said pendulum arms, base structure connecting said walls, antifriction bearings supported by each of said walls, trunnion-like shafts respectively carrying said pendulum arms in the space between said walls and having their ends journaled in said bearings to rotate respectively on spaced horizontal axes, an indicator spindle parallel to said pendulum shafts extending a substantial distance beyond the rear ends of the latter, mechanism operatively associating said spindle with said pendulum arms, an antifriction bearing supported by said front wall and in which a front portion of said spindle is journaled, a rear standard supported in fixed relation to said base structure and walls and upstanding to the level of said indicator spindle in a location displaced substantially to the rear of the other of said walls, an antifriction bearing supported by said standard in said location and in which the rear end of said indicator spindle is journaled, a weight indicating pointer carrier on said spindle at the front of said front wall, and stepped discs carried on said spindle between said other wall and said rear standard having sufficient radial extent to be intersected by the projected axes of said pendulum shafts.

OSWALD S. CARLISS.

CERTIFICATE OF CORRECTION.

Patent No. 2,354,301. July 25, 1944.

OSWALD S. CARLISS.

It is hereby certified that error appears in the printed specification of the above numbered patent requiring correction as follows: Page 4, second column, line 30, claim 10, for the word "carrier" read --carried--; and that the said Letters Patent should be read with this correction therein that the same may conform to the record of the case in the Patent Office.

Signed and sealed this 26th day of September, A. D. 1944.

Leslie Frazer (Seal) Acting Commissioner of Patents.